US012657474B2

(12) United States Patent
Zhang et al.

(10) Patent No.: US 12,657,474 B2
(45) Date of Patent: Jun. 16, 2026

(54) METHOD FOR TRAINING MACHINE TRANSLATION MODEL, AND ELECTRONIC DEVICE

(71) Applicant: BEIJING BAIDU NETCOM SCIENCE AND TECHNOLOGY CO., LTD., Beijing (CN)

(72) Inventors: Ruiqing Zhang, Beijing (CN); Xiyang Wang, Beijing (CN); Zhongjun He, Beijing (CN); Zhi Li, Beijing (CN); Hua Wu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 665 days.

(21) Appl. No.: 17/474,950

(22) Filed: Sep. 14, 2021

(65) Prior Publication Data

US 2024/0220812 A1     Jul. 4, 2024

(30) Foreign Application Priority Data

Dec. 18, 2020     (CN) .......................... 202011507120.2

(51) Int. Cl.
*G06N 3/094*          (2023.01)
(52) U.S. Cl.
CPC .................................... *G06N 3/094* (2023.01)
(58) Field of Classification Search
CPC .......... G06N 3/094; G06N 3/045; G06N 3/08; G06F 40/58; G06F 18/214
See application file for complete search history.

(56) References Cited

U.S. PATENT DOCUMENTS

| | | | | |
|---|---|---|---|---|
| 2012/0278672 A1* | 11/2012 | Sinanoglu | ...... | G01R 31/318547 714/E11.155 |
| 2019/0367019 A1* | 12/2019 | Yan | .......................... | G06N 3/09 |
| 2020/0047847 A1 | 2/2020 | Chang et al. | | |
| 2020/0364412 A1* | 11/2020 | Cheng | ................... | G06F 40/216 |
| 2021/0192364 A1* | 6/2021 | Wang | ....................... | G06N 3/09 |
| 2023/0048031 A1 | 2/2023 | Liao et al. | | |

FOREIGN PATENT DOCUMENTS

| | | | | | |
|---|---|---|---|---|---|
| CN | 110598224 A | * | 12/2019 | .............. | G06N 3/08 |
| CN | 111460837 A | | 7/2020 | | |
| CN | 111611790 A | * | 9/2020 | .......... | G06F 40/103 |
| CN | 111695356 A | | 9/2020 | | |

(Continued)

OTHER PUBLICATIONS

Xing Wu et al., "Mask and Infill": Applying Masked Language Model to Sentiment Transfer, Aug. 21, 2019, https://doi.org/10.48550/arXiv.1908.08039 (Year: 2019).*

(Continued)

*Primary Examiner* — Michelle T Bechtold
*Assistant Examiner* — Radiah Ala Islam
(74) *Attorney, Agent, or Firm* — Maschoff Brennan

(57)          ABSTRACT

A method for training a machine translation (MT) model and an electronic device are provided. The technical solution includes: obtaining an original training sample configured to train an MT model; generating at least one adversarial training sample of the MT model based on the original training sample; training the MT model based on the original training sample and the adversarial training sample.

5 Claims, 5 Drawing Sheets original training sample X mask processssing masked training sample set $X_m$ prediction processing predicted training sample set X ' recognition probability candidate adversarial training sample set $X_d$ semantic similarity adversarial training sample $X_{Adv}$

(56) References Cited

FOREIGN PATENT DOCUMENTS

| CN | 111783451 A | | 10/2020 | |
|----|----|----|----|----|
| CN | 112016310 A | * | 12/2020 | ........... G06F 40/166 |
| CN | 112634878 A | * | 4/2021 | ............. G10L 15/19 |
| JP | 2004227141 A | * | 8/2004 | ............... G06N 3/08 |
| JP | 2020126360 A | | 8/2020 | |

OTHER PUBLICATIONS

Yiren Wang et al., Multi-task Learning for Multilingual Neural Machine Translation, Oct. 6, 2020, https://doi.org/10.48550/arXiv.2010.02523 (Year: 2020).*

Yiming Cui et al., Revisiting Pre-Trained Models for Chinese Natural Language Processing, Nov. 2, 2020, Association for Computational Linguistics, http://dx.doi.org/10.18653/v1/2020.findings-emnlp.58 (Year: 2020).*

Elena Voita et al., The Bottom-up Evolution of Representations in the Transformer, Sep. 3, 2019, https://doi.org/10.48550/arXiv.1909.01380 (Year: 2019).*

Sam Yip, "What is Neural Machine Translation & How does it work?", TranslateFX, https://www.translatefx.com/blog/what-is-neural-machine-translation-engine-how-does-it-work (Year: 2020 [WayBack Machine]) (Year: 2020).*

Dabre Raj et al. A Survey of Multilingual Neural Machine Translation, Sep. 28, 2020, ACM Digital Library, https://doi.org/10.1145/3406095 (Year: 2020).*

Cui, Y., Che, W., Liu, T., Qin, B., & Yang, Z. (2021). Pre-training with whole word masking for chinese bert. IEEE/ACM Transactions on Audio, Speech, and Language Processing, 29, 3504-3514. (Year: 2021).*

Devlin, J., Chang, M. W., Lee, K., & Toutanova, K. (Jun. 2019). Bert: Pre-training of deep bidirectional transformers for language understanding. In Proceedings of the 2019 (Year: 2019).*

CN Office Action dated Jun. 7, 2023 as received in Application No. 202011507120.2.

Garg, S. et al., "BAE: BERT-based Adversarial Examples for Text Classification," (Oct. 8, 2020).

CN Office Action dated Mar. 27, 2024 as received in Application No. 202011507120.2.

JP Office Action in Application No. 2021-145079 Dated Aug. 23, 2022.

* cited by examiner

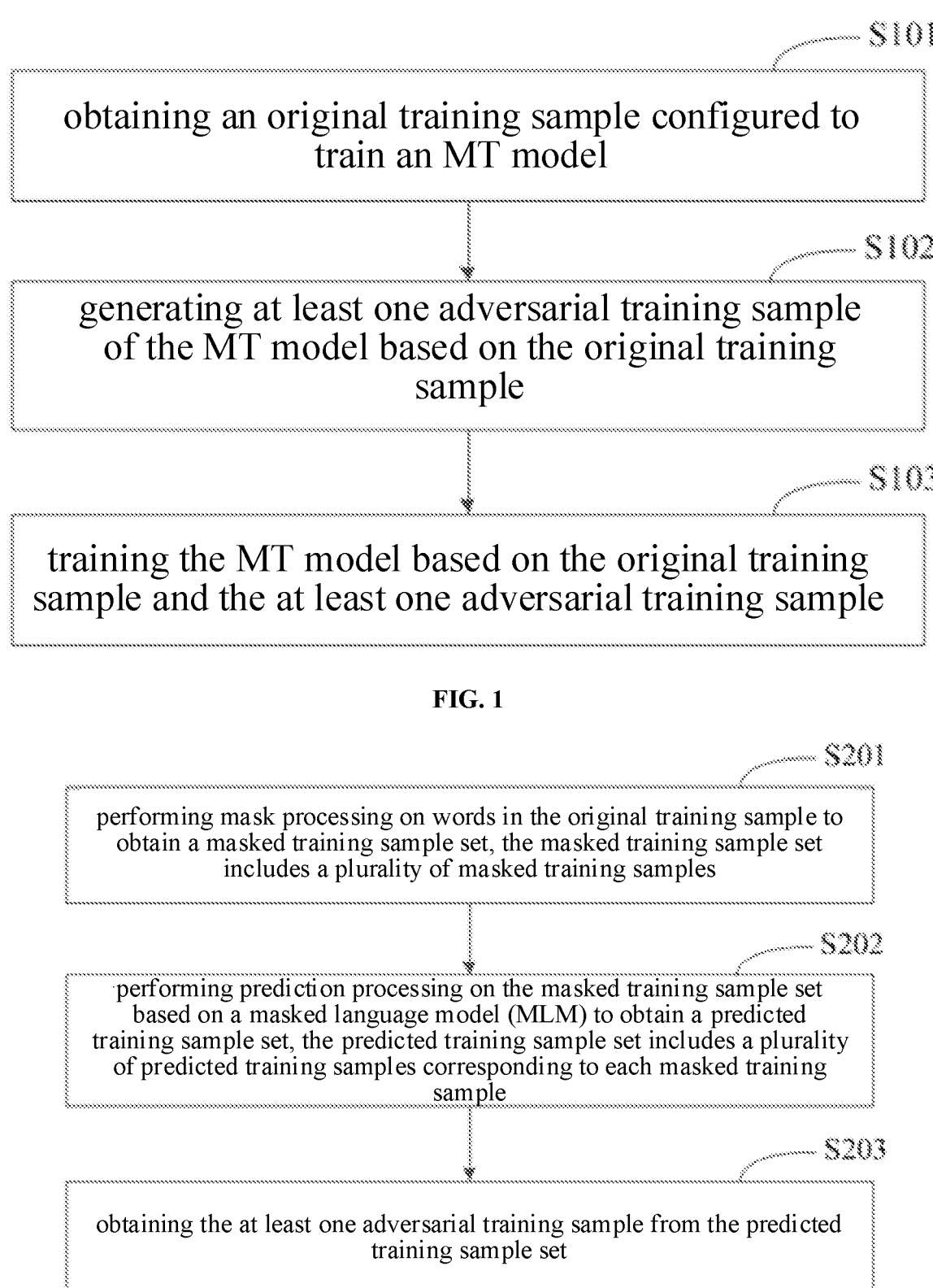

S101 obtaining an original training sample configured to
train an MT model

S102 generating at least one adversarial training sample
of the MT model based on the original training
sample

S103 training the MT model based on the original training
sample and the at least one adversarial training sample

FIG. 1

S201 performing mask processing on words in the original training sample to
obtain a masked training sample set, the masked training sample set
includes a plurality of masked training samples

S202 performing prediction processing on the masked training sample set
based on a masked language model (MLM) to obtain a predicted
training sample set, the predicted training sample set includes a plurality
of predicted training samples corresponding to each masked training
sample

S203 obtaining the at least one adversarial training sample from the predicted
training sample set

FIG. 2

METHOD FOR TRAINING MACHINE TRANSLATION MODEL, AND ELECTRONIC DEVICE

CROSS-REFERENCE TO RELATED APPLICATIONS

This application claims the benefit of priority to Chinese Application No. 202011507120.2, filed on Dec. 18, 2020, the contents of which are incorporated herein by reference in their entirety.

TECHNICAL FIELD

The present disclosure relates to a field of speech, natural language processing (NLP) and deep learning (DL) technologies, and particularly relates to a method for training a machine translation (MT) model, an electronic device, and a storage medium.

BACKGROUND

With development of artificial intelligence (AI), natural language processing (NLP) and other technologies, the machine translation (MT) technology has been widely applied in scenarios such as simultaneous interpreting and foreign language teaching. For example, in the scenario of simultaneous interpreting, the MT technology may simultaneously transform language of the speaker into different languages for the convenience of communication.

SUMMARY

A method for training a machine translation (MT) model, an electronic device, and a storage medium are provided.

According to a first aspect, a method for training an MT model is provided. The method includes: obtaining an original training sample configured to train an MT model; generating at least one adversarial training sample of the MT model based on the original training sample; and training the MT model based on the original training sample and the at least one adversarial training sample.

According to a second aspect, an electronic device is provided. The electronic device includes: at least one processor; and a memory communicatively coupled to the at least one processor. The memory stores instructions executable by the at least one processor, and the instructions are executed by the at least one processor to cause the at least one processor to execute the method for training an MT method according to the first aspect of the present disclosure.

According to a third aspect, a non-transitory computer-readable storage medium having computer instructions stored thereon is provided. The computer instructions are configured to cause a computer to execute the method for training an MT model according to the first aspect of the present disclosure.

It should be understood that, the content described in the part is not intended to identify key or important features of embodiments of the present disclosure, nor intended to limit the scope of the present disclosure. Other features of the present disclosure will be easy to understand through the following specification.

BRIEF DESCRIPTION OF THE DRAWINGS

The drawings are intended to better understand the solution, and do not constitute a limitation to the disclosure.

FIG. 1 is a flowchart illustrating a method for training a machine translation (MT) model according to a first embodiment of the present disclosure;

FIG. 2 is a flowchart illustrating a process of generating at least one adversarial training sample based on an original training sample in the method for training an MT model according to a second embodiment of the present disclosure;

DETAILED DESCRIPTION

Figure 3:
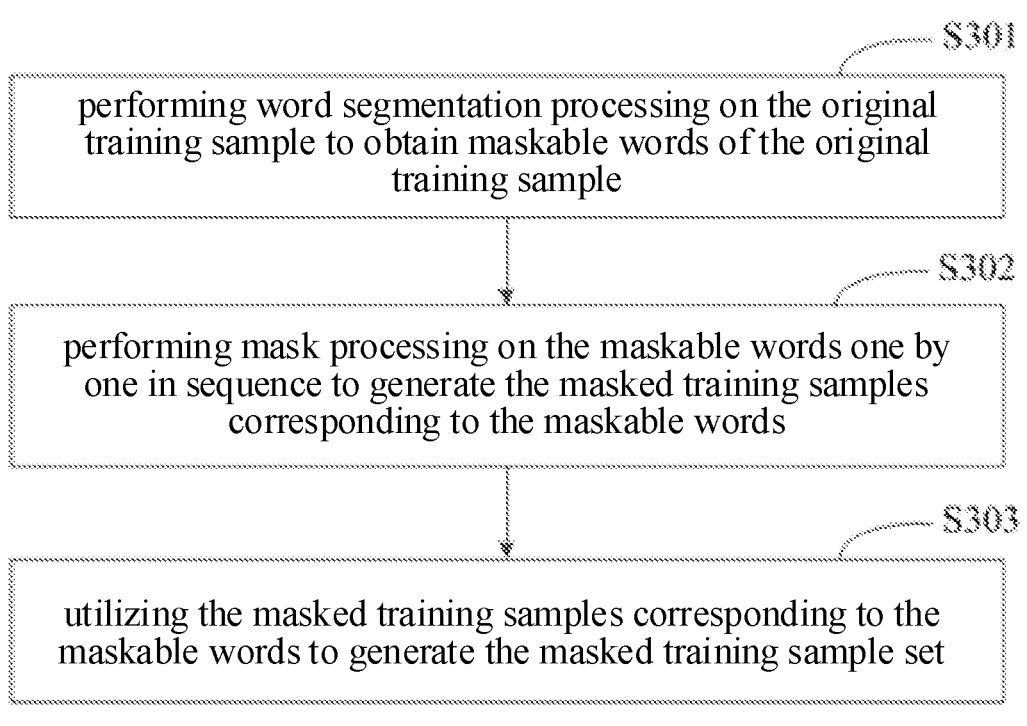
FIG. 3 is a flowchart illustrating a process of performing mask processing on words in an original training sample to obtain a masked training sample in the method for training an MT model according to a third embodiment of the present disclosure.

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

Voice may relate to voice recognition, voice interaction and other technology fields, which is an important direction in the field of artificial intelligence.

Voice Recognition is a technology that allows a machine to convert a voice signal into a corresponding text or a command through recognition and understanding process, which mainly relates to feature extraction technology, pattern matching criteria and model training technology.

Voice Interaction is a technology that a machine and a user perform interaction, communication, information exchange and other interactive behaviors with voice as an information carrier. Compared with a traditional man-machine interaction, it is convenient and efficient, with high user comfort.

Natural Language Processing (NLP) is a science of learning a computer system in especially a software system that may effectively achieve natural language communication, which is an important direction in the field of computer science and artificial intelligence.

Deep Learning (DL) is a new research direction in the field of Machine Learning (ML), which is a science that learns inherent law and representation hierarchy of sample data, so that the machine may have analytical and learning ability like human and recognize data such as texts, images and sound, which is widely applied in voice and image recognition.

In the related art, the machine translation may be performed according to an MT model. However, due to weak robustness of the MT model, it often needs to use a large number of samples to realize model training, such that it is required to manually tag a large number of data, which takes a long time and causes a large labor cost.

A method and an apparatus for training a machine translation (MT) model, an electronic device, a storage medium and a computer program product are provided.

FIG. 1 is a flowchart illustrating a method for training a machine translation model according to a first embodiment of the present disclosure.

As illustrated in FIG. 1, the method for training a machine translation model according to the first embodiment of the present disclosure includes the following.

At S101, an original training sample configured to train a machine translation model is obtained.

It should be noted that, an execution subject of the method for training a machine translation model in the embodiment of the present disclosure may be a hardware device with data information processing ability and/or a software necessary to drive the work of the hardware device.

Alternatively, the execution subject may include a workstation, a server, a computer, a user terminal and other devices. The user terminal includes but is not limited to a mobile phone, a computer, a smart voice interaction device, a smart appliance, an automobile-mounted terminal, etc.

In the embodiment of the present disclosure, the original training sample configured to train the machine translation (MT) model may be obtained. It should be understood that, in order to enhance the performance of the MT model, a large number of original training samples may be obtained typically.

The MT model may be a Neural MT (NMT) model, an attention MT model, etc., which is not limited herein.

It should be noted that, in the embodiment of the present disclosure, the language type of the original training sample is not limited.

At S102, at least one adversarial training sample of the MT model is generated based on the original training sample.

In the embodiment of the present disclosure, at least one adversarial training sample of the MT model may be generated based on the original training sample. That is, one original training sample may correspond to at least one adversarial training sample.

It should be noted that the adversarial training sample is generated based on the original training sample and is different from the original training sample, and the language type of the adversarial training sample is the same as that of the original training sample. For example, if the language type of the original training sample is Chinese, the language type of the at least one adversarial training sample is also Chinese. Similarly, if the language type of the original training sample is English, the language type of the at least one adversarial training sample is also English.

For example, if the original training sample is "Not that she didn't want to say, but that she didn't dare to say," the adversarial training sample may be "Not that she wasn't willing to say, but that she didn't dare to say", "Not that she didn't want to say, only that she didn't dare to talk", or "Not that she didn't want to say, but that she didn't dare to talk", in this case, even though the original training sample is different from the adversarial training sample literally, they are similar in semantic.

Alternatively, if the original training sample is "This thing has nothing to do with him", the adversarial training sample may be "This matter has nothing to do with him", "The matter has nothing to do with him", "This thing has no relation to him", in this case, even though the original training sample is different from the adversarial training sample literally, they are similar in semantic.

It should be understood that the original training sample and the adversarial training sample may further be in other forms, which is not limited here.

At S103, an MT model is trained based on the original training sample and the at least one adversarial training sample.

In the related art, most MT models may be trained only based on the original training sample, such that the MT models have poor robustness. For example, for an original training sample A "Not that she didn't want to say, but that she didn't dare to say", a translation result obtained by an MT model may be "It's not that she doesn't want to say it, but she doesn't dare to", and for an original training sample B "Not that she wasn't willing to say, but that she didn't dare to say", a translation result obtained by an MT model may be "She didn't want to say it, but she didn't dare to". In this case, even though the original training sample A is different from the original training sample B literally, they are similar in semantic, but translation results are different greatly. In order to solve this problem, in the related art, a large number of samples are often utilized to realize model training, such that a large number of data need to be manually tagged, which takes a long time and causes a large labor cost.

In the present disclosure, the MT model may be trained based on the original training sample and the adversarial training sample, which helps to enhance robustness of the MT model. For example, for the original training sample A "Not that she didn't want to say, but that she didn't dare to say", the corresponding adversarial training sample C may be "Not that she wasn't willing to say, but that she didn't dare to say". The MT model is trained according to the original training sample A and the adversarial training sample C so that the original training sample A and the adversarial training sample C may result in the same translation result, thereby enhancing the robustness of the MT model.

In an embodiment, standard translation results corresponding to the original training sample and the adversarial training sample may be further obtained. The original training sample and the adversarial training sample may be input to the MT model to obtain a first sample translation result and a second sample translation result output by the MT model. The first sample translation result is a translation result corresponding to the original training sample and the second sample translation result is a translation result corresponding to the adversarial training sample.

There may exist major differences between the first sample translation result and the second sample translation result, the MT model may be trained according to the above differences till the MT model converges or the number of iterations reaches a preset number threshold or a model precision reaches a preset precision threshold. Then, training of the MT model may be terminated, and the MT model obtained from the last round of training is taken as a trained MT model. The preset number threshold and a preset precision threshold may be set according to actual situations.

In summary, according to the method for training an MT model in the present disclosure, an original training sample configured to train an MT model may be obtained, and at least one adversarial training sample of the MT model may be generated based on the original training sample, and the MT model may be trained based on the original training sample and the adversarial training sample. In this way, the method helps to enhance the robustness of the MT model. Compared with adopting a large number of samples to train a model in the related art, the method may automatically generate the adversarial training sample based on the original training sample without manually tagging a large number of data, which saves labor and resources, leading to a low cost.

On the basis of any one embodiment of the present disclosure, as illustrated in FIG. 2, the action of generating at least one adversarial training sample of the MT model based on the original training sample at S102 may include the following.

At S201, mask processing is performed on words in the original training sample to obtain a masked training sample set, and the masked training sample set includes a plurality of masked training samples.

In the embodiment of the present disclosure, mask processing may be performed on the words in the original training sample to obtain the masked training sample set. It should be understood that one original training sample may consist of a plurality of words, and one or more words in the original training sample may be masked to obtain a plurality of masked training samples, and further to obtain the masked training sample set consisting of the plurality of masked training samples. Each original training sample may correspond to one masked training sample set.

For example, if the original training sample is "Not that she didn't want to say, but that she didn't dare to say", the corresponding masked training sample set may include a plurality of masked training samples as below: "[MASK] she didn't want to say, but that she didn't dare to say", "Not that she [MASK] say, but that she didn't dare to say", "Not that she didn't want to say, but that she didn't dare [MASK]".

Alternatively, if the original training sample is "This thing has nothing to do with him", the corresponding masked training sample set may include a plurality of masked training samples as below: "[MASK] thing has nothing to do with him", "This thing has nothing to do [MASK]", and "This thing [MASK] with him".

At S202, prediction processing is performed on the masked training sample set based on a masked language model (MLM) to obtain a predicted training sample set, and the predicted training sample set includes a plurality of predicted training samples corresponding to each masked training sample.

In the embodiment of the present disclosure, prediction processing may be performed on the masked training sample set based on the MLM, to obtain the predicted training sample set. It is understandable that, prediction processing may be performed on each masked training sample in the masked training sample set, and one masked training sample may correspond to a plurality of predicted training samples, and further the predicted training sample set consisting of the plurality of predicted training samples may be obtained. Each original training sample may correspond to one predicted training sample set.

For example, if the masked training sample is "[MASK] she didn't want to say, but that she didn't dare to say", a plurality of corresponding predicted training samples may be "Indeed she didn't want to say, but that she didn't dare to say", "Originally she didn't want to say, but that she didn't dare to say", and "If she didn't want to say, but that she didn't dare to say".

Alternatively, if the masked training sample is "This thing has nothing to do [MASK]", a plurality of corresponding predicted candidate samples may be "This thing has nothing to do with him", "This thing has nothing to do against him", and "This thing has nothing to do together with him".

Alternatively, the MLM may be set according to actual situations.

At S203, the at least one adversarial training sample is obtained from the predicted training sample set.

In the embodiment of the present disclosure, each original training sample may correspond to one predicted training sample set, and the predicted training sample set includes a plurality of predicted training samples corresponding to each masked training sample, such that at least one adversarial training sample may be obtained from the predicted training sample set as the at least one adversarial training sample corresponding to the original training sample.

Therefore, according to the method, mask processing may be performed on words in the original training sample to obtain a masked training sample set, and prediction processing may be performed on the masked training sample set based on a masked language model to obtain a predicted training sample set, and at least one adversarial training sample may be obtained from the predicted training sample set. In this way, the adversarial training sample may be obtained through the MSM, which solves the problem that the adversarial learning technology cannot be applied to MT in the related art.

On the basis of any one embodiment of the present disclosure, as illustrated in FIG. 3, the action of performing mask processing on words in the original training sample to obtain a masked training sample at S201 may include the following.

At S301, word segmentation processing is performed on the original training sample, to obtain maskable words of the original training sample.

It is understandable that the original training sample may consist of a plurality of words, including maskable words and non-maskable words. The maskable word refers to a word that may go through the mask processing. The non-maskable word refers to a word that may not go through the mask processing. Word segmentation processing may be performed on the original training sample, to obtain the maskable words of the original training sample.

Alternatively, performing word segmentation processing on the original training sample, to obtain maskable words of the original training sample may include performing word segmentation processing on the original training sample to obtain a plurality of words of the original training sample, and determining the maskable words from the plurality of words based on a part of speech of each word.

The maskable word may be determined from the plurality of words based on the part-of-speech of each word as follows. When the part-of-speech of the word indicates that the word is a stop word such as pronouns and modal word, it is determined that the word is a non-maskable word, whereas, when the part-of-speech of the word indicates that the word is not a stop word such as pronouns and modal word, it is determined that the word is a maskable word.

For example, if the original training sample is "Not that she didn't want to say, but that she didn't dare to say", word segmentation processing may be performed first to obtain a plurality of words including "she", "not that", "didn't want to", "say", "but that", "she didn't dare to" and "say", in which "she" is a pronoun. In this case, "she" may be determined as a non-maskable word, and other words are determined as maskable words.

Alternatively, a part-of-speech information list of non-maskable words may be pre-established, and after a plurality of words of the original training sample are obtained, the part-of-speech of each word may match the part-of-speech information list, if it matches successfully, the word may be determined to be a non-maskable word, and if it fails to match, the word may be determined to be a maskable word. It should be noted that the part-of-speech information list may include all kinds of possible part-of-speech information of non-maskable words and may be set according to actual situations.

At S302, mask processing is performed on the maskable words one by one in sequence to generate the masked training sample corresponding to the maskable words.

In the embodiment of the present application, mask processing may be performed on the maskable words one by one in sequence, that is, mask processing may be performed on the maskable word one by one according to a sequential order of the maskable words in the original training sample, in positive sequence or in reverse sequence, which is not limited herein.

For example, if the original training sample is "Not that she didn't want to say, but that she didn't dare to say", the corresponding maskable words may be "she", "not that", "didn't want to", "say", "but that", "she didn't dare to" and "say" in an order from front to back. In this case, the masked training sample corresponding to the maskable word "she" is "[MASK] she didn't want to say, but that she didn't dare to say", and the masked training sample corresponding to the maskable word "she didn't dare to" is "Not that she [MASK] say, but that she didn't dare to say", and so on, which is not enumerated here.

At S303, the masked training samples corresponding to the maskable words are utilized to generate the masked training sample set.

In the embodiment of the present disclosure, each maskable word may correspond to one masked training sample, and the masked training sample corresponding to the each maskable word may be utilized to generate the masked training sample set.

For example, if the original training sample is "Not that she didn't want to say, but that she didn't dare to say", the corresponding maskable word are "she", "not that", "didn't want to", "say", "but that", "she didn't dare to" and "say", in an order from front to back, and the corresponding masked training sample set may include a plurality of masked training samples as below: "[MASK] she didn't want to say, but that she didn't dare to say", "Not that she [MASK] say, but that she didn't dare to say", "Not that she want to [MASK], but that she didn't dare to say", "Not that she want to say, [MASK] she didn't dare to say", "Not that she want to say, but that [MASK] say" and "Not that she didn't want to say, but that she didn't dare [MASK])".

Therefore, according to the method, word segmentation processing may be performed on the original training sample to obtain maskable words of the original training sample, and mask processing may be performed on the maskable words one by one in sequence to generate masked training samples corresponding to the maskable words, and the masked training samples corresponding to the maskable words may be utilized to generate the masked training sample set.

Figure 4:
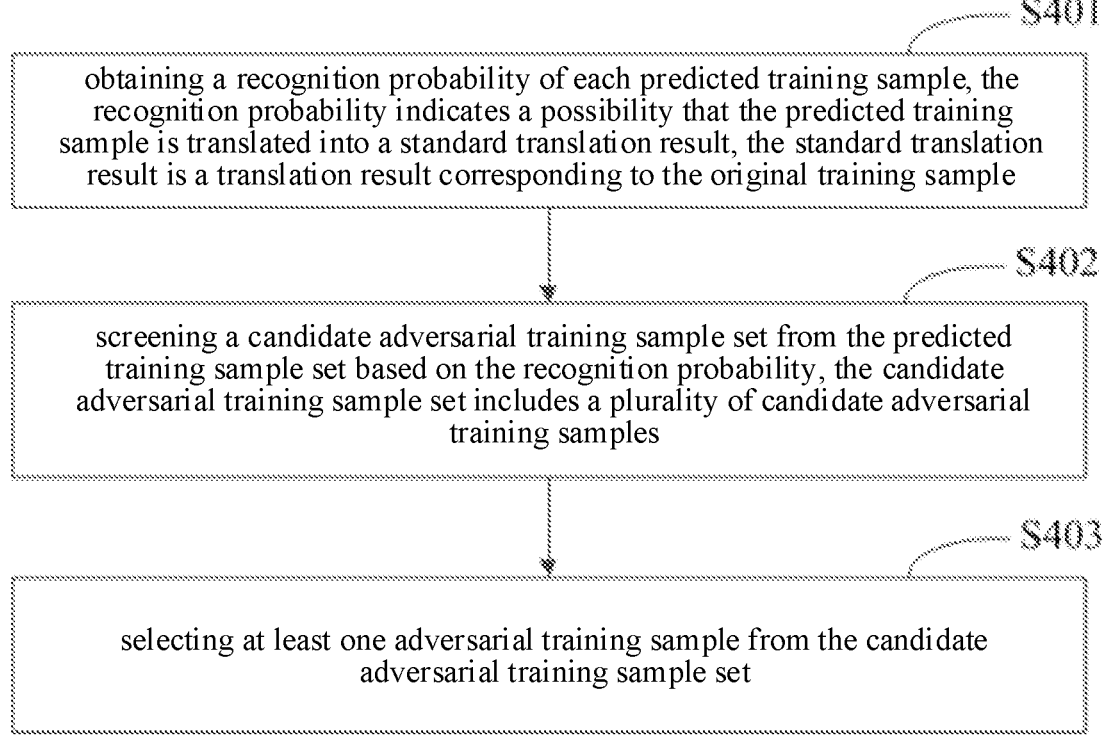
FIG. 4 is a flowchart illustrating a process of obtaining at least one adversarial training sample from a predicted training sample set in the method for training an MT model according to a fourth embodiment of the present disclosure.

On the basis of any one embodiment of the present disclosure, as illustrated in FIG. 4, the action of obtaining the at least one adversarial training sample from the predicted training sample set at S203 may include the following.

At S401, a recognition probability of each predicted training sample is obtained, the recognition probability indicates a possibility that the predicted training sample is translated into a standard translation result, and the standard translation result is a translation result corresponding to the original training sample.

It is understandable that, the predicted training sample differs from the original training sample, and accordingly, the translation result corresponding to the predicted training sample may differ from the standard translation result.

In the embodiment of the present disclosure, the recognition probability of each predicted training sample may be obtained, which may indicate the possibility that the predicted training sample is translated into the standard translation result.

Alternatively, each predicted training sample may be input to the MT model, and the MT model performs machine translation on each predicted training sample to obtain the recognition probability of each predicted training sample. For example, the MT model may adopt a forced decoding technology so that each predicted training sample is translated into the standard translation result and the recognition probability of each predicted training sample is obtained.

At S402, a candidate adversarial training sample set is screened from the predicted training sample set based on the recognition probability, and the candidate adversarial training sample set includes a plurality of candidate adversarial training samples.

In the embodiment of the present disclosure, the candidate adversarial training sample set may be screened from the predicted training sample set based on the recognition probability. It is understandable that the greater the recognition probability is, the greater the probability of the predicted training sample being translated into the standard translation result is, while the smaller the recognition probability is, the smaller the probability of the predicted training sample being translated into the standard translation result is.

Alternatively, the predicted training sample with the recognition probability less than a preset probability threshold may be screened from the predicted training sample set as a candidate adversarial training sample, to generate the candidate adversarial training sample set. The preset probability threshold may be set according to actual situations.

It is understandable that the predicted training sample with the recognition probability less than the preset probability threshold is screened from the predicted training sample set, i.e. the predicted training sample whose probability of being translated into the standard translation result is less than the preset probability threshold is screened. It can be seen that these screened samples have a greater impact on enhancing the robustness of the MT model, thus they may be configured as candidate adversarial training samples which may generate the candidate adversarial training sample set.

At S403, at least one adversarial training sample is selected from the candidate adversarial training sample set.

Alternatively, selecting at least one adversarial training sample from the candidate adversarial training sample set may include obtaining a semantic similarity between each candidate adversarial training sample in the candidate adversarial training sample set and the original training sample, and selecting at least one candidate adversarial training sample with the semantic similarity larger than a preset similarity threshold from the candidate adversarial training sample set as the adversarial training sample. Therefore, according to the method, the candidate adversarial training sample with the semantic similarity larger than the preset similarity threshold may be taken as the adversarial training sample, such that the adversarial training sample may be accurately selected from the candidate adversarial training sample set.

Alternatively, the candidate adversarial training sample and the original training sample may be input into a semantic similarity model to obtain the semantic similarity between the candidate adversarial training sample and the original training sample.

The semantic similarity model may be set according to actual situations.

Alternatively, the preset similarity threshold may be set according to actual situations.

For example, if the original training sample is "Not that she wasn't willing to say, but that she didn't dare to say", the corresponding candidate adversarial sample set include a plurality of candidate training samples: "Not that she didn't want to say, only that she didn't dare to talk", "Not that she didn't want to say, but that she didn't dare to talk", "Indeed she didn't want to say, but that she didn't dare to say", "Not that she didn't want to do, but that she didn't dare to say", "Not that she didn't want to say, only that she didn't dare to talk," "Not that she didn't want to say, but that she cannot say" and "Not that she didn't want to say, but that she didn't dare to talk". The above candidate training samples may be numbered as 1, 2 to 6 in sequence. The semantic similarity between the candidate training samples numbered as 1, 3, 5 and the original training sample is less than the preset similarity threshold, and the semantic similarity between the candidate training samples numbered as 2, 4, 6 and the original training sample is greater than the preset similarity threshold, then the candidate training samples numbered as 2, 4, 6 may be taken as adversarial training samples.

Therefore, according to the method, a recognition probability of each predicted training sample which indicates a possibility that the predicted training sample is translated into a standard translation result may be obtained, and a candidate adversarial training sample set is screened from the predicted training sample set based on the recognition probability, in which the candidate adversarial training sample set includes a plurality of candidate adversarial training samples, and at least one adversarial training sample is selected from a candidate adversarial training sample set.

Figure 5:
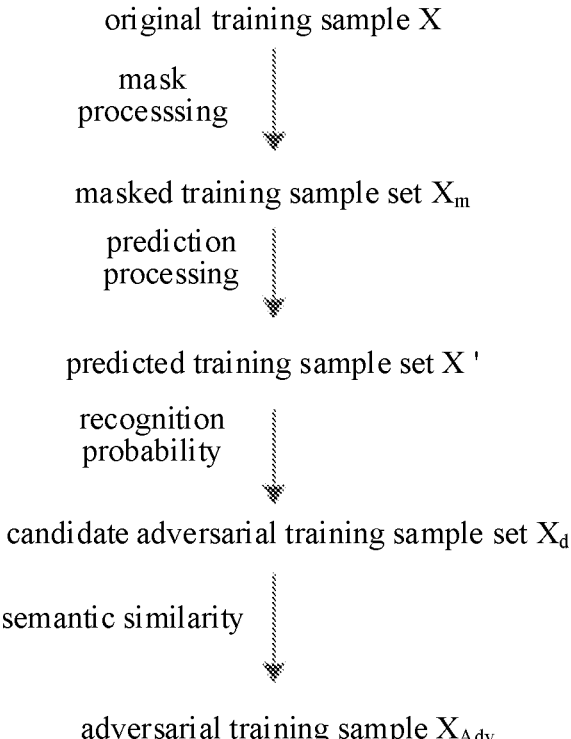
FIG. 5 is a diagram illustrating a method for training an MT model according to a fifth embodiment of the present disclosure.

As illustrated in FIG. 5, an original training sample X configured to train an MT model may be obtained, mask processing is performed on words in the original training sample to obtain a masked training sample set $X_m$, and prediction processing is performed on the masked training sample set based on an MLM to obtain a predicted training sample set X', and each predicted training sample in the predicted training sample set X' may be input to the MT model to obtain a recognition probability of each predicted training sample which indicates the possibility that the predicted training sample is translated into a standard translation result, and a candidate adversarial training sample set $X_d$ may be screened from the predicted training sample set X' based on the recognition probability, and at least one adversarial training sample $X_{Adv}$ may be selected from the candidate adversarial training sample set $X_d$ based on a semantic similarity. The MT model may be trained based on the original training sample X and the adversarial training sample $X_{Adv}$.

Figure 6:
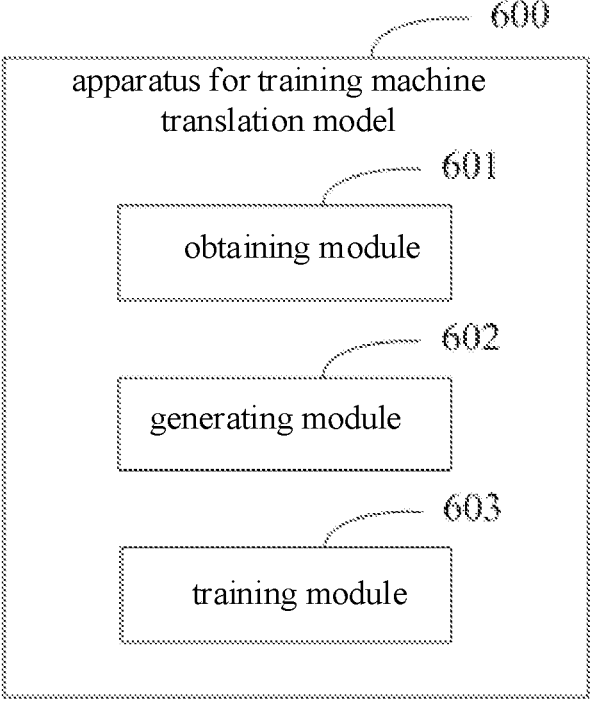
FIG. 6 is a block diagram illustrating an apparatus for training an MT model according to a first embodiment of the present disclosure.

FIG. 6 is a block diagram illustrating an apparatus for training an MT model according to a first embodiment of the present disclosure.

As illustrated in FIG. 6, the apparatus 600 for training an MT model in the embodiment of the present disclosure includes an obtaining module 601, a generating module 602 and a training module 603.

The obtaining module 601 is configured to obtain an original training sample configured to train an MT model.

The generating module 602 is configured to generate at least one adversarial training sample of the MT model based on the original training sample.

The training module 603 is configured to train the MT model based on the original training sample and the at least one adversarial training sample.

In summary, according to the apparatus for training an MT model in the present disclosure, an original training sample configured to train an MT model may be obtained, and at least one adversarial training sample of the MT model may be generated based on the original training sample, and the MT model may be trained based on the original training sample and the adversarial training sample, which helps to enhance robustness of the MT model. Compared with adopting a large number of samples to train a model in the related art, the apparatus may automatically generate the adversarial training sample based on the original training sample without manually tagging a large number of data, which saves labor and resources, leading to a low cost.

Figure 7:
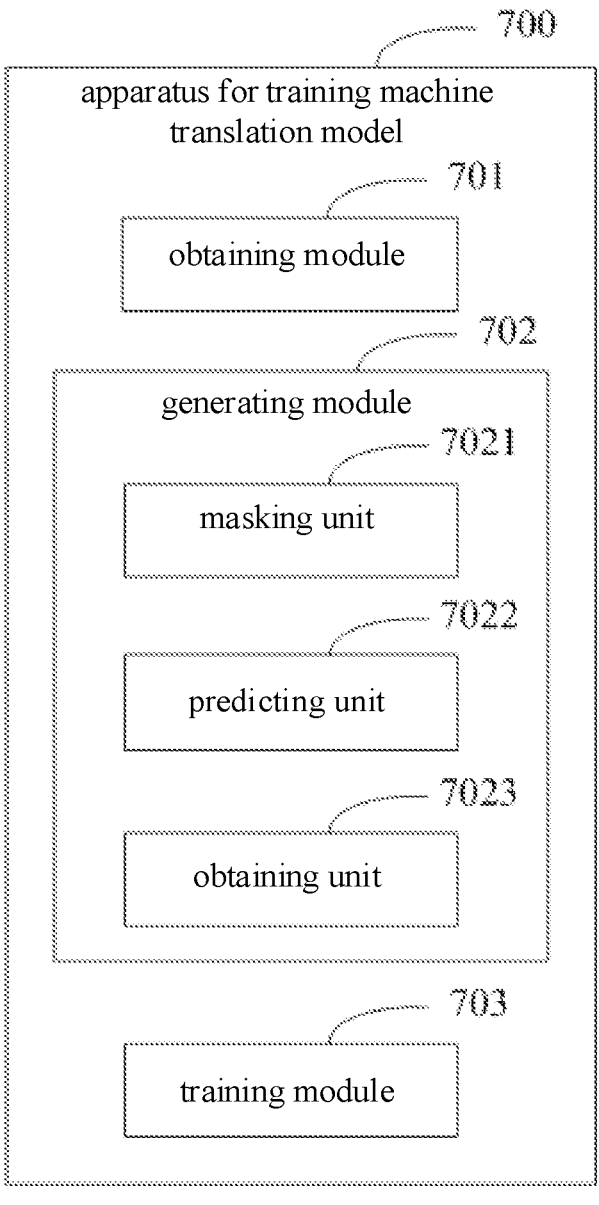
FIG. 7 is a block diagram illustrating an apparatus for training an MT model according to a second embodiment of the present disclosure.

FIG. 7 is a block diagram illustrating an apparatus for training an MT model according to a second embodiment of the present disclosure.

As illustrated in FIG. 7, the apparatus 700 for training an MT model in the embodiment of the present disclosure includes an obtaining module 701, a generating module 702 and a training module 703.

The obtaining module 701 has the same function and structure as the obtaining module 601, and the training module 703 has the same function and structure as the training module 603.

In an embodiment of the present disclosure, the generating module 702 includes: a masking unit 7021, configured to perform mask processing on words in the original training sample to obtain a masked training sample set, in which the masked training sample set includes a plurality of masked training samples; a predicting unit 7022, configured to perform prediction processing on the masked training sample set based on an MLM to obtain a predicted training sample set, in which the predicted training sample set includes a plurality of predicted training samples corresponding to each masked training sample; an obtaining unit 7023, configured to obtain the at least one adversarial training sample from the predicted training sample set.

In an embodiment of the present disclosure, the obtaining unit 7023 includes: an obtaining subunit, configured to obtain a recognition probability of the each predicted training sample in which the recognition probability indicates a possibility that the predicted training sample is translated into a standard translation result, and the standard translation result is a translation result corresponding to the original training sample; a screening subunit, configured to screen a candidate adversarial training sample set from the predicted training sample set based on the recognition probability, in which the candidate adversarial training sample set includes a plurality of candidate adversarial training samples; a selecting subunit, configured to select the at least one adversarial training sample from the candidate adversarial training sample set.

In an embodiment of the present disclosure, the screening subunit is configured to screen a predicted training sample with the recognition probability less than a preset probability threshold from the predicted training sample set as the candidate adversarial training sample, to generate the candidate adversarial training sample set.

In an embodiment of the present disclosure, the obtaining subunit is configured to input each predicted training sample to the MT model, and perform machine translation on each predicted training sample by the MT model, to obtain the recognition probability of each predicted training sample.

In an embodiment of the present disclosure, the selecting subunit is configured to obtain a semantic similarity between each candidate adversarial training sample in the candidate adversarial training sample set and the original training sample, and select at least one candidate adversarial training sample with the semantic similarity larger than a preset similarity threshold from the candidate adversarial training sample set as the at least one adversarial training sample.

In an embodiment of the present disclosure, the masking unit 7021 includes: a word segmenting subunit, configured to perform word segmentation processing on the original training sample, to obtain maskable words of the original training sample; a masking subunit, configured to perform mask processing on the maskable words one by one in sequence, to generate the masked training samples corresponding to the maskable words; a generating subunit, configured to utilize the masked training samples corresponding to the maskable words, to generated the mask training sample set.

In an embodiment of the present disclosure, the word segmenting subunit is configured to perform word segmentation processing on the original training sample to obtain a plurality of words of the original training sample, and determine the maskable words from the plurality of words according to a part of speech of each word.

In summary, according to the apparatus for training an MT model in the present disclosure, an original training sample configured to train an MT model may be obtained, and at least one adversarial training sample of the MT model may be generated based on the original training sample, and the MT model may be trained based on the original training sample and the adversarial training sample, which helps to enhance the robustness of the MT model. Compared with adopting a large number of samples to train a model in the related art, the apparatus may automatically generate the adversarial training sample based on the original training sample without manually tagging a large number of data, which saves labor and resources, leading to a low cost.

Figure 8:
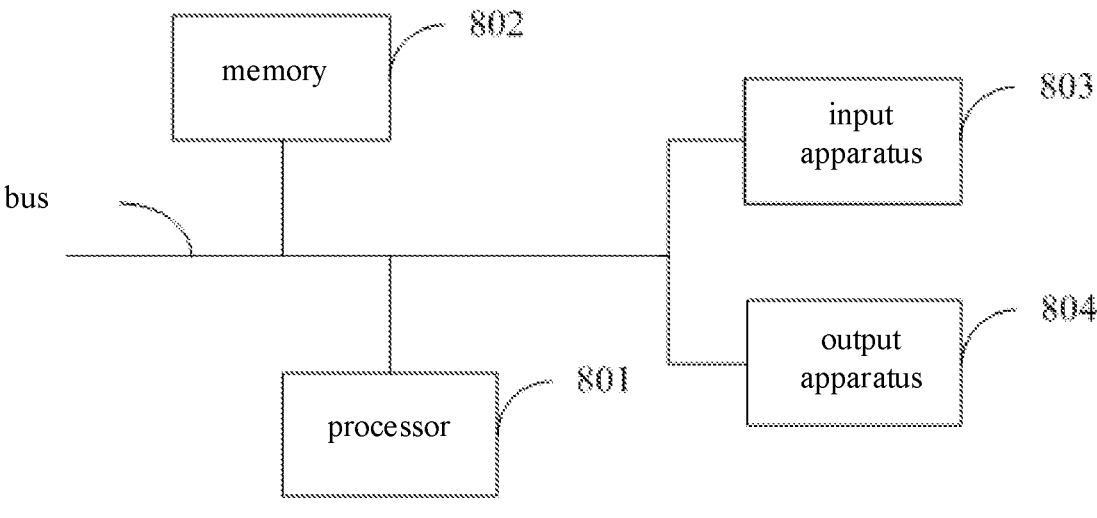
FIG. 8 is a block diagram illustrating an electronic device configured to implement a method for training an MT model according to an embodiment of the present disclosure.

In the embodiment of the present disclosure, an electronic device, a readable storage medium and a computer program product are further provided according to embodiments of the present disclosure FIG. 8 is a block diagram illustrating an electronic device in the method for training an MT model provided in the embodiment of the present disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as intelligent speech interaction devices, personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 8, the electronic device includes: one or more processors 801, a memory 802, and an interface configured to connect various components, including a high-speed interface and a low-speed interface. The various components are connected to each other with different buses, and may be installed on a public main board or installed in other ways as needed. The processor 801 may process instructions executed in the electronic device, including instructions stored in or on the memory to display graphical information of the GUI on an external input/output device (such as a display device coupled to an interface). In other implementation, a plurality of processors and/or a plurality of buses may be configured with a plurality of memories if necessary. Similarly, the processor may connect a plurality of electronic devices, and each device provides a part of necessary operations (for example, as a server array, a group of blade servers, or a multi-processor system). FIG. 8 takes one processor 801 as an example.

A memory 802 is a non-transitory computer-readable storage medium provided in the present disclosure. The memory stores instructions executable by the at least one processor, so that the at least one processor executes a method for training an MT model as described in the present disclosure. The non-transitory computer-readable storage medium of the present disclosure stores computer instructions, in which the computer instructions are configured so that a method for training an MT model provided in the present disclosure.

As a non-transitory computer-readable storage medium, the memory 802 may be configured to store non-transitory software programs, non-transitory computer-executable programs and modules, such as program instructions/modules corresponding to a method for training an MT model in the embodiment of the present disclosure (for example, an obtaining module 601, a generating module 602 and a training module 603 as illustrated in FIG. 6). The processor 801 executes various functional applications and data processing of the server by running a non-transitory software program, an instruction, and a module stored in the memory 802, that is, a method for adversarial training of an MT model in the above method embodiment is implemented.

The memory 802 may include a program storage area and a data storage area; the program storage area may store operation systems and application programs required by at least one function; the data storage area may store data created based on the use of an electronic device according to the method for training an MT model, etc. In addition, the memory 802 may include a high-speed random access memory, and may also include a non-transitory memory, such as at least one magnetic disk storage device, a flash memory device, or other non-transitory solid-state storage devices. In some embodiments, the memory 802 optionally includes a memory set remotely relative to the processor 801 that may be connected to an electronic device executing a method for training an MT model via a network. The example of the above networks includes but not limited to an Internet, an enterprise intranet, a local area network, a mobile communication network and their combination.

An electronic device in a method for training an MT model may further include an input apparatus 803 and an output apparatus 804. The processor 801, the memory 802, the input apparatus 803, and the output apparatus 804 may be connected through a bus or in other ways. FIG. 8 takes connection through a bus as an example.

The input apparatus 803 may receive input digital or character information, and generate key signal input related to user setting and function control of an electronic device executing a method for training an MT model, such as a touch screen, a keypad, a mouse, a track pad, a touch pad, an indicating rod, one or more mouse buttons, a trackball, a joystick and other input apparatuses. The output apparatus 804 may include a display device, an auxiliary lighting apparatus (for example, a LED) and a tactile feedback apparatus (for example, a vibration motor), etc. The display device may include but not limited to a liquid crystal display (LCD), a light emitting diode (LED) display and a plasma display. In some implementations, a display device may be a touch screen.

Various implementation modes of the systems and technologies described herein may be implemented in a digital electronic circuit system, an integrated circuit system, a dedicated ASIC (application specific integrated circuit), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

The computer programs (also called as programs, softwares, software applications, or codes) include machine instructions of a programmable processor, and may be implemented with high-level procedure and/or object-oriented programming languages, and/or assembly/machine languages. As used herein, the terms "a machine-readable medium" and "a computer-readable medium" refer to any computer program product, device, and/or apparatus configured to provide machine instructions and/or data for a programmable processor (for example, a magnetic disk, an optical disk, a memory, a programmable logic device (PLD)), including a machine-readable medium that receive machine instructions as machine-readable signals. The term "a machine-readable signal" refers to any signal configured to provide machine instructions and/or data for a programmable processor.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), a blockchain network, and an internet.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, also known as a cloud computing server or a cloud host, is a host product in a cloud computing service system, to solve the shortcomings of large management difficulty and weak business expansibility existed in the traditional physical host and Virtual Private Server (VPS) service. A server further may be a server with a distributed system, or a server in combination with a blockchain.

According to an embodiment, a computer program product is further provided in the present disclosure, which includes a computer program, in which the computer program is configured to execute a method for training an MT model as described when executed by a processor.

According to the technical solution of the embodiments of the present disclosure, at least one adversarial training sample of the MT model may be generated based on the original training sample, and the MT model may be trained based on the original training sample and the adversarial training sample, which helps to enhance the robustness of the MT model. Compared with adopting a large number of samples to train a model in the related art, the method may automatically generate the adversarial training sample based on the original training sample without manually tagging a large number of data, which saves labor and resources, leading to a low cost.

It should be understood that, various forms of procedures shown above may be configured to reorder, add or delete blocks. For example, blocks described in the present disclosure may be executed in parallel, sequentially, or in a different order, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of embodiments of the present disclosure.

What is claimed is:

1. A method of training a machine translation (MT) model for MT comprising:

obtaining an original training sample configured to train the MT model;

performing mask processing on words in the original training sample to obtain a masked training sample set, wherein the masked training sample set comprises a plurality of masked training samples;

performing prediction processing on the masked training sample set based on a masked language model (MLM) to obtain a predicted training sample set, wherein the predicted training sample set comprises a plurality of predicted training samples corresponding to each masked training sample;

obtaining at least one adversarial training sample of the MT model from the predicted training sample set, wherein the original training sample is literally different from but semantically similar to the at least one adversarial training sample;

obtaining a first sample translation result and a second sample translation result output by the MT model, wherein the first sample translation result is a translation result corresponding to the original training sample and the second sample translation result is a translation result corresponding to the adversarial training sample;

training the MT model based on the first sample translation result and the second sample translation result to obtain a trained MT model; and performing the MT using the trained MT model;

wherein, performing mask processing on words in the original training sample to obtain the masked training sample set comprises:

performing word segmentation processing on words in the original training sample to obtain the masked training sample set comprises:

performing word segmentation processing on the original training sample to obtain a plurality of words of the original training sample, wherein the original training sample includes maskable and non-maskable words;

matching a part of speech of each word of the plurality of words with a pre-established part-of-speech information list of non-maskable words;

determining one or more words of the plurality of words as failing to match;

in response to the one or more words failing to match, designating the one or more words to be maskable words;

performing mask processing on the maskable words one by one in sequence to generate the masked training samples corresponding to the maskable words; and utilizing the masked training samples corresponding to the maskable words to generate the masked training sample set;

wherein, obtaining the at least one adversarial training sample from the predicted training sample set comprises:

obtaining a recognition probability of each predicted training sample, wherein the recognition probability indicates a possibility that the predicted training sample is translated into a reference translation result, wherein the reference translation result is a translation result corresponding to the original training sample;

screening a predicted training sample with the recognition probability less than a preset probability threshold from the predicted training sample set as the candidate adversarial training sample, to generate the candidate adversarial training sample set, wherein the candidate adversarial training sample set comprises a plurality of candidate adversarial training samples;

obtaining a semantic similarity between each candidate adversarial training sample in the candidate adversarial training sample set and the original training sample; and selecting at least one candidate adversarial training sample having the semantic similarity greater than a preset similarity threshold from the candidate adversarial training sample set as the at least one adversarial training sample;

wherein training the MT model comprises training the MT model based on differences between the first sample translation result and the second sample translation result until the MT model converges, or a number of iterations reaches a preset number threshold, or a model precision reaches a preset precision threshold.

2. The method of claim 1, wherein, obtaining a recognition probability of each predicted training sample, comprises:

inputting each predicted training sample to the MT model, and performing machine translation on each predicted training sample by the MT model to obtain the recognition probability of each predicted training sample.

3. An electronic device, comprising:

at least one processor; and a memory communicatively coupled to the at least one processor; wherein, the memory stores instructions executable by the at least one processor, wherein the instructions are executed by the at least one processor to cause the at least one processor to execute the method for training a machine translation (MT) model, comprising:

obtaining an original training sample configured to train an MT model for MT;

performing mask processing on words in the original training sample to obtain a masked training sample set, wherein the masked training sample set comprises a plurality of masked training samples;

performing prediction processing on the masked training sample set based on a masked language model (MLM) to obtain a predicted training sample set, wherein the predicted training sample set comprises a plurality of predicted training samples corresponding to each masked training sample;

obtaining at least one adversarial training sample of the MT model from the predicted training sample set, wherein the original training sample is literally different from but semantically similar to the at least one adversarial training sample;

obtaining a first sample translation result and a second sample translation result output by the MT model, wherein the first sample translation result is a translation result corresponding to the original training sample and the second sample translation result is a translation result corresponding to the adversarial training sample;

training the MT model based on the first sample translation result and the second sample translation result to obtain a trained MT model; and performing the MT using the trained MT model;

wherein, performing mask processing on words in the original training sample to obtain the masked training sample set comprises:

performing word segmentation processing on the original training sample to obtain a plurality of words of the original training sample, wherein the original training sample includes maskable words and non-maskable words;

matching a part of speech of each word of the plurality of words with a pre-established part-of-speech information list of non-maskable words;

determining one or more words of the plurality of words as failing to match;

in response to the one or more words failing to match, designating the one or more words to be maskable words;

performing mask processing on the maskable words one by one in sequence to generate the masked training samples corresponding to the maskable words; and utilizing the masked training samples corresponding to the maskable words to generate the masked training sample set;

wherein, obtaining the at least one adversarial training sample from the predicted training sample set comprises:

obtaining a recognition probability of each predicted training sample, wherein the recognition probability indicates a possibility that the predicted training sample is translated into a reference translation result, wherein the reference translation result is a translation result corresponding to the original training sample;

screening a predicted training sample with the recognition probability less than a preset probability threshold from the predicted training sample set as the candidate adversarial training sample, to generate the candidate adversarial training sample set, wherein the candidate adversarial training sample set comprises a plurality of candidate adversarial training samples;

obtaining a semantic similarity between each candidate adversarial training sample in the candidate adversarial training sample set and the original training sample; and selecting at least one candidate adversarial training sample having the semantic similarity greater than a preset similarity threshold from the candidate adversarial training sample set as the at least one adversarial training sample;

wherein training the MT model comprises training the MT model based on differences between the first sample translation result and the second sample translation result until the MT model converges, or a number of iterations reaches a preset number threshold, or a model precision reaches a preset precision threshold.

4. The device of claim 2, wherein, obtaining a recognition probability of each predicted training sample, comprises:

inputting each predicted training sample to the MT model, and performing machine translation on each predicted training sample by the MT model to obtain the recognition probability of each predicted training sample.

5. A non-transitory computer-readable storage medium storing computer instructions, wherein the computer instructions are configured to cause a computer to execute the method for training a machine translation (MT) model, comprising:

obtaining an original training sample configured to train an MT model for MT;

performing mask processing on words in the original training sample to obtain a masked training sample set, wherein the masked training sample set comprises a plurality of masked training samples;

performing prediction processing on the masked training sample set based on a masked language model (MLM) to obtain a predicted training sample set, wherein the predicted training sample set comprises a plurality of predicted training samples corresponding to each masked training sample;

obtaining at least one adversarial training sample of the MT model from the predicted training sample set, wherein the original training sample is literally different from but semantically similar to the at least one adversarial training sample;

obtaining a first sample translation result and a second sample translation result output by the MT model, wherein the first sample translation result is a translation result corresponding to the original training sample and the second sample translation result is a translation result corresponding to the adversarial training sample;

training the MT model based on the first sample translation result and the second sample translation result to obtain a trained MT model; and performing the MT using the trained MT model;

wherein, performing mask processing on words in the original training sample to obtain the masked training sample set comprises:

performing word segmentation processing on the original training sample to obtain a plurality of words of the original training sample, wherein the original training sample includes maskable words and non-maskable words;

matching a part of speech of each word of the plurality of words with a pre-established part-of-speech information list of non-maskable words;

determining one or more words of the plurality of words as failing to match;

in response to the one or more words failing to match, designating the one or more words to be maskable words;

performing mask processing on the maskable words one by one in sequence to generate the masked training samples corresponding to the maskable words; and utilizing the masked training samples corresponding to the maskable words to generate the masked training sample set;

wherein, obtaining the at least one adversarial training sample from the predicted training sample set comprises:

obtaining a recognition probability of each predicted training sample, wherein the recognition probability indicates a possibility that the predicted training sample is translated into a reference translation result, wherein the reference translation result is a translation result corresponding to the original training sample;

screening a predicted training sample with the recognition probability less than a preset probability threshold from the predicted training sample set as the candidate adversarial training sample, to generate the candidate adversarial training sample set, wherein the candidate adversarial training sample set comprises a plurality of candidate adversarial training samples;

obtaining a semantic similarity between each candidate adversarial training sample in the candidate adversarial training sample set and the original training sample; and selecting at least one candidate adversarial training sample having the semantic similarity greater than a preset similarity threshold from the candidate adversarial training sample set as the at least one adversarial training sample;

wherein training the MT model comprises training the MT model based on differences between the first sample translation result and the second sample translation result until the MT model converges, or a number of iterations reaches a preset number threshold, or a model precision reaches a preset precision threshold.

* * * * *